United States Patent
Pier, II.

[11] Patent Number: 5,887,932
[45] Date of Patent: Mar. 30, 1999

[54] PET ENCLOSURE FOR PICKUP TRUCKS

[76] Inventor: Thomas M. Pier, II., 6573 S. Huron River Rd., S. Rockwood, Mich. 48179

[21] Appl. No.: 871,715

[22] Filed: Jun. 9, 1997

[51] Int. Cl.[6] ...................................................... B60P 7/06
[52] U.S. Cl. ............................... 296/43; 296/6; 296/24.2; 296/36; 296/3
[58] Field of Search ................................ 296/43, 6, 24.2, 296/36, 3, 32; 119/452, 453

[56] References Cited

U.S. PATENT DOCUMENTS

| | | | |
|---|---|---|---|
| 511,272 | 12/1893 | Hughes | 119/452 |
| 592,194 | 10/1897 | Bumpass | 119/453 |
| 3,989,148 | 11/1976 | Donohue | 296/36 |
| 4,335,915 | 6/1982 | Knapp | 296/43 |
| 4,381,123 | 4/1983 | Anderson | 296/43 |
| 4,611,824 | 9/1986 | McIntosh | 280/748 |
| 4,657,299 | 4/1987 | Mahan | 296/159 |
| 4,960,302 | 10/1990 | Walters | 296/136 |
| 5,007,672 | 4/1991 | Koch | 296/100 |
| 5,065,699 | 11/1991 | Marshall | 119/453 |
| 5,423,587 | 6/1995 | Ingram | 296/3 |
| 5,516,181 | 5/1996 | Thompson | 296/136 |
| 5,562,139 | 10/1996 | Cseri | 296/136 |

FOREIGN PATENT DOCUMENTS

| | | | |
|---|---|---|---|
| 4229849 | 3/1994 | Netherlands | 296/24.2 |

*Primary Examiner*—Joseph D. Pape
*Assistant Examiner*—Kiran Patel
*Attorney, Agent, or Firm*—Henderson & Sturm

[57] ABSTRACT

A pet enclosure device 10 for use with the bed 101 of a conventional pickup truck. The enclosure device 10 includes a plurality of stake member 20 dimensioned to be received in the stake openings 102 of the pickup truck, an open weave elongated enclosure member 30 fabricated from a single sheet of netting material 31 and a securing unit 13 for operatively connecting the netting member 30 to the plurality of stake members 20.

3 Claims, 2 Drawing Sheets

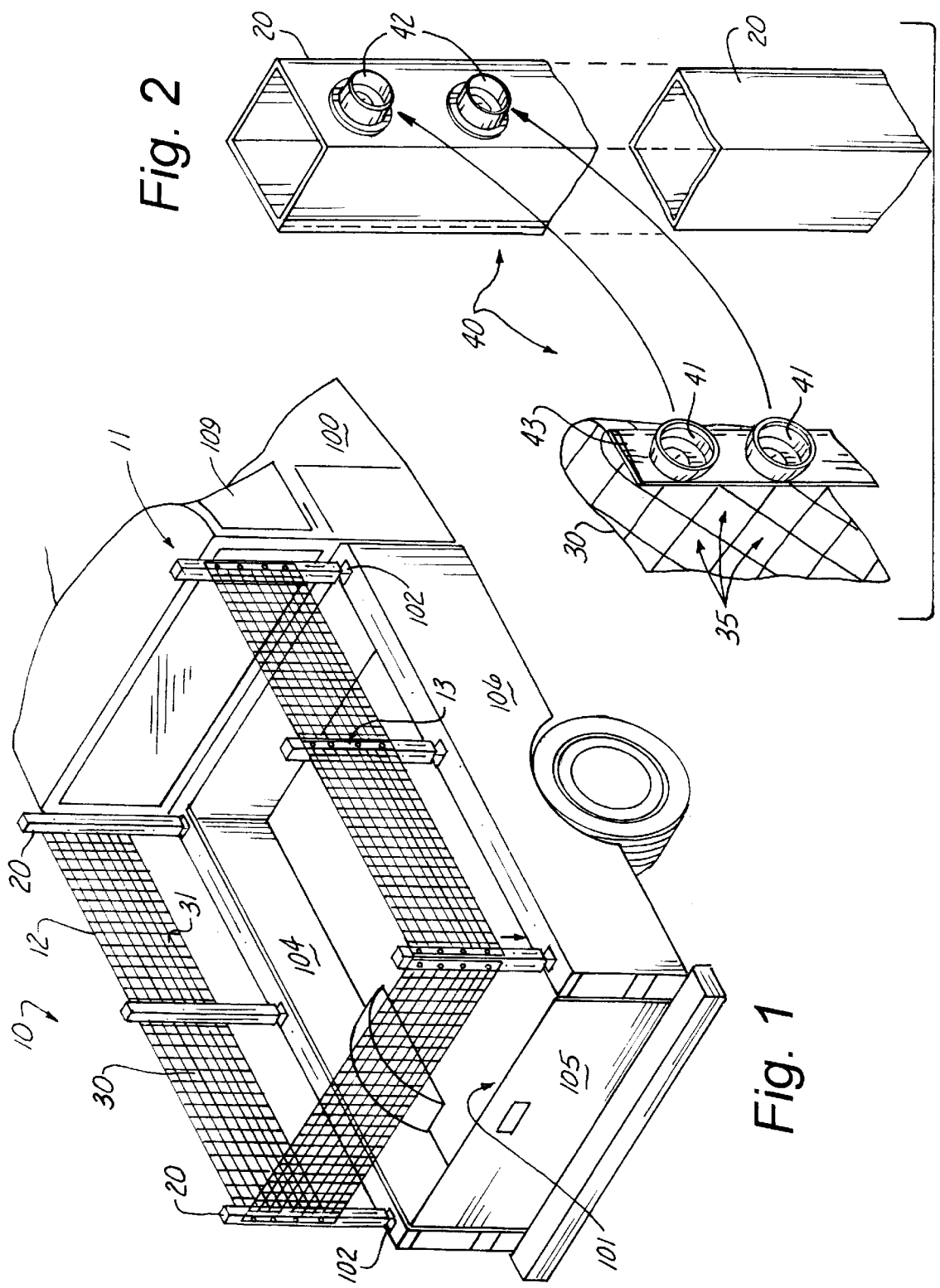

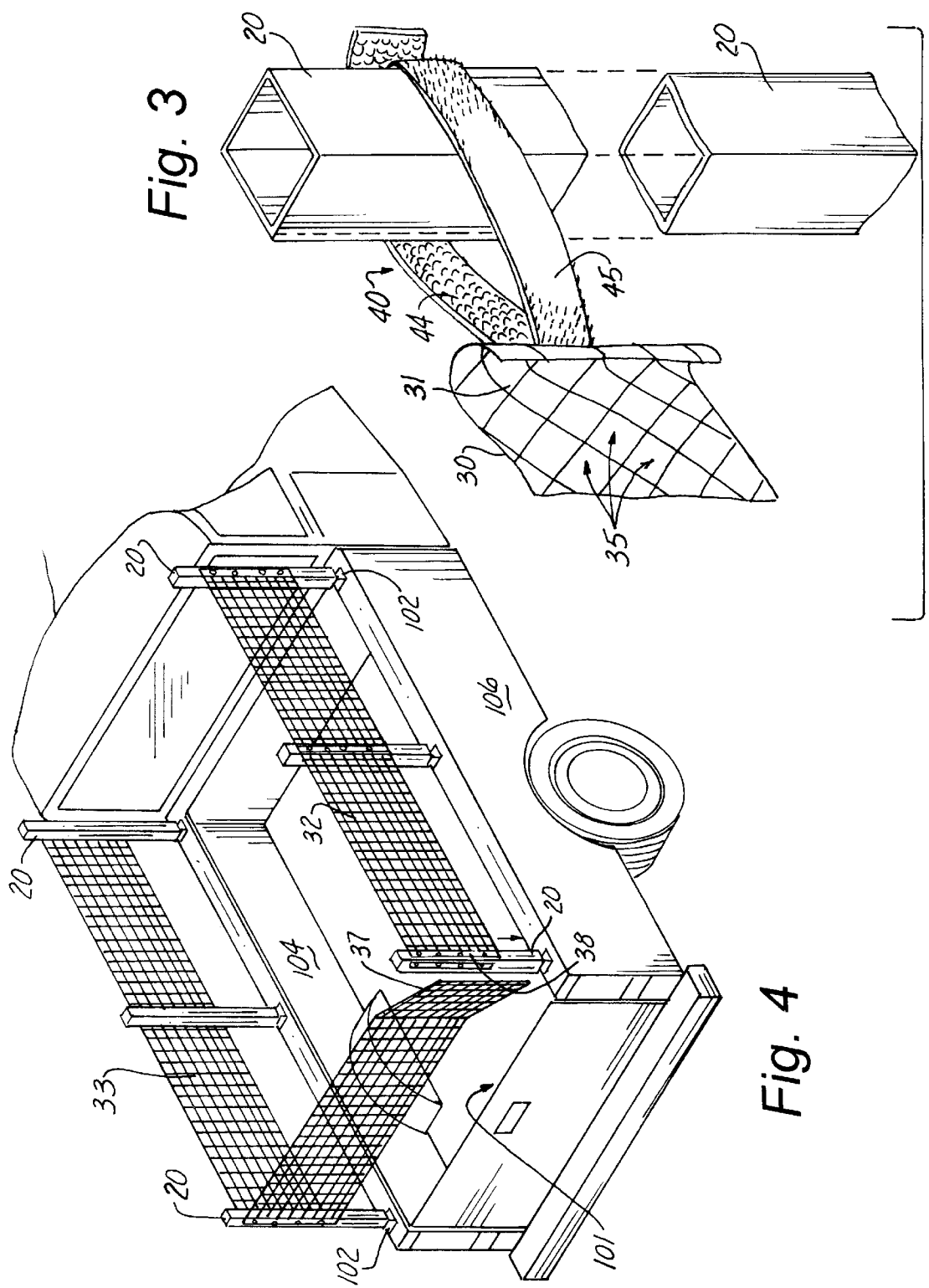

PET ENCLOSURE FOR PICKUP TRUCKS

CROSS REFERENCE TO RELATED APPLICATIONS

Not applicable

STATEMENT REGARDING FEDERALLY SPONSORED RESEARCH OR DEVELOPMENT

Not applicable

REFERENCE TO MICROFICHE APPENDIX

Not applicable

BACKGROUND OF THE INVENTION

1. Field of the Invention

The present invention relates to the field of pickup truck accessories in general, and in particular to a framework enclosure which surrounds the rear and both sides of a pickup truck bed.

2. Description of Related Art

As can be seen by reference to the following U.S. Pat. Nos. 4,381,123; 4,611,824; 4,657,299; and 5,007,672, the prior art is replete with myriad and diverse framework arrangements designed to expand the utilitarian uses of the bed of a pickup truck.

While all of the aforementioned prior art constructions are more than adequate for the basic purpose and function for which they have been specifically designed, they are uniformly deficient with regard to their ability to function in accordance with the principles embodied in the present invention.

As anyone who owns both a pickup truck and a pet such as a dog, or the like, is all too well aware, there is always an element of danger involved in transporting the animal in the back of an open pickup truck bed. Unfortunately, more than one domestic animal has met an untimely demise by falling, jumping or being thrown out of the back of such a vehicle, causing an untold amount of grief, not to mention financial loss to the pet owner.

As a consequence of the foregoing situation, there has existed a longstanding need among pet owners for a new type of pet enclosure, specifically designed for the open bed of a pickup truck that will not only provide a safe enclosure for the pet, but also provide substantially unimpaired visibility to the operator of the vehicle and the provision of such a construction is a stated objective of the present invention.

BRIEF SUMMARY OF THE INVENTION

Briefly stated, the pet enclosure for pickup trucks that forms the basis of the present invention comprises in general, a plurality of support units and an enclosure unit provided with fastening means that operatively attach the enclosure unit to the support units.

As will be explained in greater detail further on in the specification, the enclosure unit comprises one or more elongated sheets of netting that are adapted to be secured to the support units to provide a flexible open-weave enclosure for the bed of a pickup truck that will safely restrain and prevent a domestic animal from escaping from the confines of the bed of the pickup truck.

In addition, due to the flexible open-weave nature of the netting member, at least minimal visibility will be maintained along the sides of the enclosure unit. A substantially unrestricted line of sight will be maintained directly rearwardly of the tailgate of the pickup truck through the enclosure openings.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein:

FIG. 1 is an exploded perspective view of the pet enclosure of this invention and the bed of a pickup truck;

FIG. 2 is an isolated detail view of one of the securing means contemplated for use in conjunction with this invention;

FIG. 3 is an isolated detail view of another securing means contemplated for use with this invention; and FIG. 4 is an exploded perspective view of another version of the device employed on the bed of a pickup truck.

DETAILED DESCRIPTION OF THE INVENTION

As can be seen by reference to the drawings, and in particularly to FIG. 1, the pet enclosure device for pickup trucks that forms the basis of the present invention is designated generally by the reference number 10. The enclosure device 10 comprises in general, support unit 11, an enclosure unit 12, and a securing unit 13 for releasably attaching the enclosure unit 12 to the support unit 11. These units will now be described in seriatim fashion.

As can best be seen by reference to FIG. 1, the support unit 11 comprises in general, a plurality of generally elongated stake members 20 having a generally rectangular cross-sectional configuration. The lower ends of the stake members 20 are dimensioned to be received in the stake openings 102 which are standard features in the bed 101 of a conventional pickup truck 100.

Still referring to FIG. 1, it can be seen that in the preferred embodiment of the invention, the enclosure unit 12 comprises in general, an elongated open weave enclosure member 30 fabricated from a single elongated sheet of netting 31 or the like which is dimensioned to extend along both quarterpanels 104, 106 and the tailgate 105 of the bed 101 of the pickup truck 100 and to be releasably secured to the stake members 20 by the securing unit 13.

As can also be seen by reference to FIG. 4, in an alternate version of the preferred embodiment the enclosure member 30 is also fabricated from a single elongated sheet of netting 31 which has been severed to create a right hand segment 32 and a left hand segment 33. Both of the segments 32, 33 extend along the length of one of the quarterpanels 104, 106 of the bed 101 of the pickup truck and at least one of the segments 32 or 33 extends a substantial distance across the tailgate portion 105 of the pickup truck 100 and has a free end 37 that is adapted to be operatively connected to the free end 38 of the other segment 33 or 32 and/or one of the stake members 20 to complete the enclosure.

In the first version depicted in FIG. 1, the domestic animal would be sufficiently small so as to gain access and egress relative to the bed 101 of the pickup truck 100 in the space beneath the netting member 30 created by the opening of the tailgate 105. In the version depicted in FIG. 4, the entire vertical airspace above the tailgate 105 may be opened by disconnecting the two netting segments 32, 33 to permit the ingress and egress of a domestic animal of virtually any size.

Turning now to FIG. 2, it can be seen that in the preferred embodiment of the invention, the securing unit 13 comprises a securing member designated generally as 40 which includes one or more snap fastening components 41 which are fixedly secured to each of the stake members 20, and one or more cooperating snap fastening components 42 which are adhered to a reinforced strip 43 which is vertically aligned and permanently secured at spaced intervals on the netting member 30 such that the netting member 30 may be releasably suspended and supported from the stake member 20 in a well recognized fashion.

In the alternate version of the preferred embodiment depicted in FIG. 3, it can be seen that the securing member 40 comprises pairs of hook and loop fasteners 44, 45 that are fixedly secured on one end at spaced locations on the netting member 30 and dimensioned to surround and captively engage the stake members 20 by engaging the free ends of the hook and loop fasteners 44, 45 to one another in a well recognized fashion.

At this juncture, it should be noted that the interstices or openings 35 in the netting member 30 provide a substantially unobstructed view from the passenger compartment 109 through the tailgate portion of the netting member 30 and that the flexible nature of the netting member 30 in conjunction with the netting openings 35 provides a somewhat obstructed, yet still acceptable view from a safety standpoint through the quarterpanel portions of the netting member 30.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooded parts together, whereas, a screw employs a helical surface, in the environment of fastening wooden parts, a nail and a screw may be equivalent structures.

I claim:

1. A pet enclosure device for use with the bed of a conventional pickup truck bed having a tailgate and quarter panels provided with stake openings wherein the enclosure device consisting of:

a support unit including a plurality of elongated stake members dimensioned to be received in the stake openings in the pickup truck bed;

an enclosure unit consisting of an elongated open weave enclosure member fabricated from a sheet of netting material; and two distinct segments of netting material wherein each distinct segment of netting material has an effective length at least as long as one of the quarter panels of the pickup truck and at least one of the segments of netting material has a length that extends at least partially across the tailgate of the pickup truck;

first means for releasably securing the netting segments to the plurality of elongated stake members; and second means for temporarily joining the two distinct segments of netting material together to form a length of netting which extends completely across the tailgate of the pickup truck.

2. The enclosure device as in claim 1 wherein said first means for releasably securing the two segments of netting material to the plurality of stake members consists of snap fastener components operatively secured to both the netting member and each of the stake members.

3. The enclosure device as in claim 1 wherein said first means for releasably securing the two segments of netting material to the plurality of stake members consists of a plurality of hook and loop fasteners operatively associated with the netting member and said plurality of stake members.

* * * * *